United States Patent [19]

Moriyama

[11] Patent Number: 4,509,257
[45] Date of Patent: Apr. 9, 1985

[54] METHOD OF AND APPARATUS FOR BARING THE END OF SHEATHED MULTICORE CABLE

[76] Inventor: Takashi Moriyama, 2-3-3, Uozaki-Nishimachi, Higashinada-ku, Kobe 658, Japan

[21] Appl. No.: 496,425

[22] Filed: May 20, 1983

[30] Foreign Application Priority Data

Jun. 18, 1982 [JP] Japan ................................ 57-105634
Oct. 6, 1982 [JP] Japan ................................ 57-176820

[51] Int. Cl.³ ........................ H01R 43/00; H02G 1/12
[52] U.S. Cl. ...................................... 29/825; 81/9.42; 83/924
[58] Field of Search ............... 81/9.51, 9.5 R, 9.5 A; 29/825, 564.4; 83/924

[56] References Cited

U.S. PATENT DOCUMENTS

| | | |
|---|---|---|
| 2,120,398 | 6/1938 | Edwards et al. |
| 2,683,308 | 7/1954 | Cook |
| 3,212,369 | 10/1965 | Way |
| 3,330,036 | 7/1967 | Mahoney ........................... 81/9.5 R |
| 3,541,896 | 11/1970 | Watson ................................ 81/9.51 |
| 3,614,905 | 10/1971 | Bieganski ......................... 81/9.5 R |
| 3,895,426 | 7/1975 | Papsdorf ............................ 81/9.5 X |
| 4,063,343 | 12/1977 | Reymond et al. ................. 81/9.51 X |
| 4,194,281 | 3/1980 | Gudmestad |
| 4,207,782 | 6/1980 | Farmer ................................ 81/9.51 |
| 4,275,619 | 6/1981 | Shimizu |
| 4,454,652 | 6/1984 | Suzuki et al. ..................... 29/753 X |

FOREIGN PATENT DOCUMENTS

| | | |
|---|---|---|
| 6602761 | 3/1966 | Fed. Rep. of Germany |
| 1992564 | 5/1968 | Fed. Rep. of Germany |
| 2705829 | 6/1980 | Fed. Rep. of Germany |
| 470777 | 5/1969 | Switzerland |
| 931338 | 7/1963 | United Kingdom |
| 1434464 | 5/1976 | United Kingdom |
| 1471506 | 4/1977 | United Kingdom |
| 1539630 | 1/1979 | United Kingdom |

Primary Examiner—Howard N. Goldberg
Assistant Examiner—Carl J. Arbes
Attorney, Agent, or Firm—Marshall, O'Toole, Gerstein, Murray & Bicknell

[57] ABSTRACT

This disclosure relates to an apparatus for and a method of baring an electric cable including a plurality of insulated wires covered by a sheath. The apparatus comprises a pair of box-like frames hinged together along one edge to move between open and closed positions and adapted to receive the cable in a position that is generally parallel to the hinge axis, means on said frames for holding them in the closed position. A first pair of clamp members are fixed to one of said frames adjacent its one end thereof, and a second pair of clamp members are slideably supported within the said frames for movement generally parallel to the hinge axis. A pair of cutters are also supported within the frames adjacent the clamp members, and the cutters have cooperating cutting edges for cutting through the sheath. A lever is connected to the pair of frames for moving the second pair of clamp members relative to said frames and to the first pair of clamp members.

The method comprises moving an end portion of a sheath utilizing the foregoing apparatus.

13 Claims, 24 Drawing Figures

METHOD OF AND APPARATUS FOR BARING THE END OF SHEATHED MULTICORE CABLE

The present invention relates to a method of and apparatus for removing the sheath from an end of a multicore sheathed electric cable, more particularly from such a cable containing a plurality of insulated wires covered by an outer sheath.

A conventional method of baring the end of a multicore sheathed cable end includes the steps of removing a predetermined length of the sheath at one end to expose all the coated or insulated wires, and then removing the insulation from the end of each wire one by one. This takes time and is increasingly laborious with the number of coated wires. Also, there is a possibility of damaging the core wires when the coated wires are manually bared by a tool such as a stripper and a nipper. Further, the exposed lengths of the core wires are uneven.

It is a general object of this invention to provide a method of and apparatus for baring an electric cable, and the core wires thereof, accurately and quickly in a simple operation.

It is another object of the invention to provide such an apparatus which is also adapted to attach a connection terminal to an electric cable or coated wire.

In accordance with the present invention, apparatus is provided for baring an electric cable including a plurality of insulated wires covered by a sheath, said apparatus comprising a pair of frames hinged together to move between open and closed positions and adapted to receive the cable therebetween, the cable being parallel to the hinge axis, means for holding the frames closed on the cable, a first pair adjacent clamp members fastened to said frames adjacent its one end thereof, a second pair of adjacent clamp members slideably supported within the frames in a direction that is generally parallel to said hinge axis, a pair of cutter blades supported within the frames and the blades having cooperating cutting edges for cutting through the sheath, and a lever coupled to the frames for moving the second pair of clamp members relative to the frames and the first pair of clamp members.

The invention further comprises the method of removing a portion of a sheath by operation of the foregoing apparatus.

Preferred embodiments of this invention are described with reference to the figures of the accompanying drawings, wherein.

Figures 1, 3:
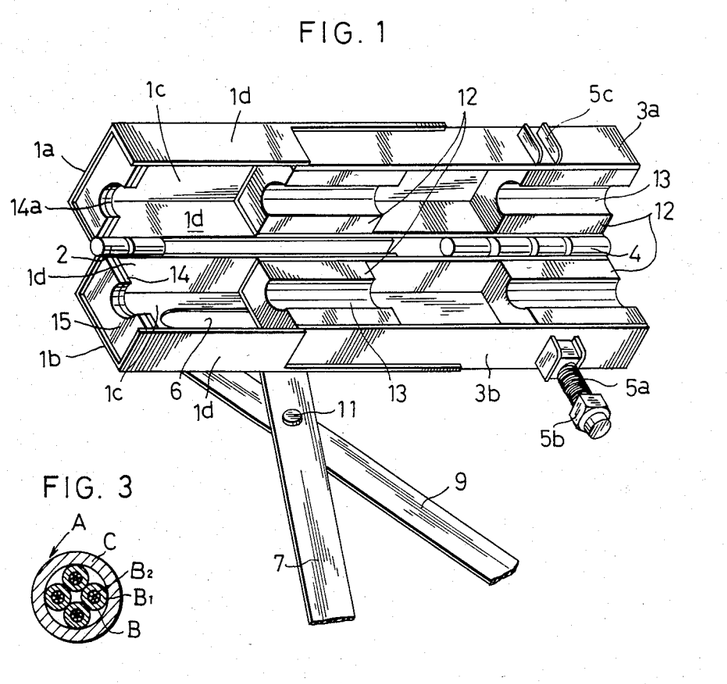
FIG. 1 is a perspective view of an apparatus according to this invention, showing it in an open condition.
FIG. 3 is an enlarged sectional view of a multicore electric cable taken on line 3—3 of FIG. 2.
Figure 2:
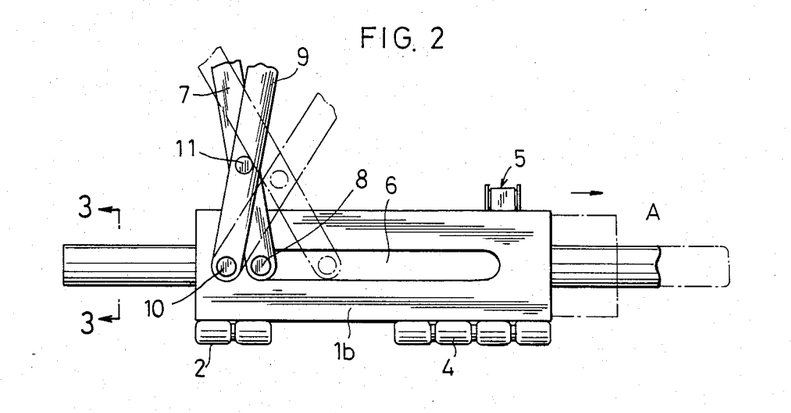
FIG. 2 is a plan view of the apparatus of FIG. 1, but showing it in a closed condition.

FIGS. 1 and 2 show an apparatus for use in removing the sheath from an end of a cable and for baring the ends of the core wires. A pair of elongated casings or frames 1a and 1b each has a web side 1c, two lateral side walls 1d, an open side and two open ends. The casings 1a and 1b are pivotably coupled together by a hinge 2 which is attached to adjacent side walls 1d adjacent the open side wall. The casing 1b is formed with a longitudinal slot 6 in its web side 1c.

A pair of elongated hollow die holders 3a and 3b are slideably positioned in the casings, each having a web side, two lateral sides and an open side. The holders 3a and 3b are snugly positioned in the casings and are longitudinally slideably and telescopically held within the casings 1a and 1b. The holders are also pivotably coupled together at one edge by a hinge 4. The hinges 2 and 4 are on the same axis so that the holders 3a and 3b may pivot with the casings between open and closed positions.

When in the open position the holders and the casings are separated as shown in FIG. 1, and when they are pivoted or folded to the closed position, the two casings form a box or enclosure having an open end, and the holders slide in the box and through the open end, as illustrated in FIG. 2.

The holders 3a, 3b have a fastener 5 fastened to them, which includes a bolt 5a that has its head pivotally attached to one holder 3b, a nut 5b threaded around the bolt, and bracket arms 5c secured to the other holder 3a to engage the nut.

A pair of levers 7 and 9 connected in a scissors configuration are provided to move the holders in the casings. The holder 3b has the lever 7 mounted at one end to its web side by a pivot pin 8 which is movable along the slot 6, so that the lever 7 slides along the outside of the casing 1b. The slotted casing 1b has the lever 9 mounted at one end to its web side by a pivot pin 10. The levers 7 and 9 are coupled together by a pivot pin 11 for pivotal movement to slide the holders 3a and 3b relative to the casings 1a and 1b.

The holders 3a and 3b have two pairs of spaced clamp dies 12 mounted within them, one of the dies of the pairs being secured at one end of each holder. Each die 12 of each pair has a longitudinal groove 13 which mates with that in the companion die.

The casings 1a and 1b have a pair of replaceable cutter blades 14 fastened therein adjacent its open end. Each blade 14 has a semicircular cutting edge 14a which cooperates with the edge of the mating blade.

The casings also have a pair of clamp members 15 replaceably held therein between its open end and the cutter blades 14 and closely adjacent the cutter. The clamp members 15 have substantially the same shape as the cutter blades 14, but has non cutting semicircular edges of a radius slightly smaller than the cutting edges.

As best shown in FIG. 3, the cable A to be operated on has a plurality of wires B, each having a core wire B2 coated with flexible insulating material B1 such as rubber or vinyl compound. The group of coated wires B are covered by a flexible insulating sheath C also made of a material such as rubber or vinyl compound.

In operation, the holders 3a and 3b are moved by the levers 7 and 9 to the maximum retracted position in the casings 1a and 1b, which is shown by the solid lines in FIG. 2. The cable A is placed in the grooves 13 between the mating casings and holders, with its end portion protruded forwardly through the curved openings in the blades 14 and the clamps 15 (FIG. 2). The casings and the holders are then pivoted to close them on the cable.

Figure 4A:
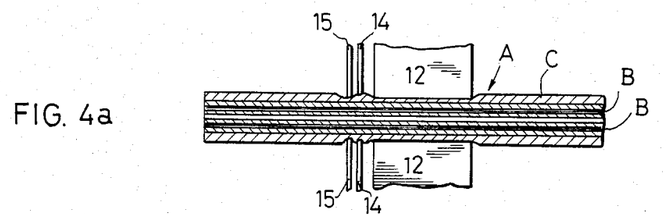
FIGS. 4a–4e are fragmentary sectional views showing steps of the method of operation of the apparatus in FIGS. 1 and 2.

The fastener 5 is then engaged by placing the nut 5b over the bracket arms 5c and then tightening the nut so as to tightly clamp the cable between the mating die grooves 13 and between the clamp members 15. This action also makes a circular or circumferential cut through the cable sheath C by the cutter 14 (see FIG. 4a). The cut should be shallow so as not to damage the coated wires B.

Figure 4B:
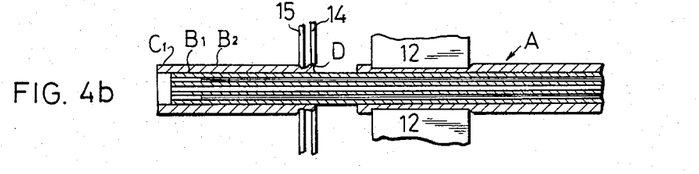

In this condition, the levers 7 and 9 are then opened or spread about the pivot 11 so as to slide the holders 3a and 3b toward the right and out of the casings 1a, 1b, as shown by the dash-dot lines in FIG. 2. Since the holders 13 tightly grip the main part of the cable, this action also moves the main cable part to the right, but the clamps 15 tightly grip the cut sheath portion C1, thereby separating the forward sheath portion C1 from the remaining sheath C at the cut line D. This action also forwardly stretches or extends the portion of each wire coating B1 which is forward of the dies 12 (FIG. 4b). Because the core wires B2 do not extend, in effect, the forward ends of the wires B2 are retracted into the coatings B1.

Figure 4C:
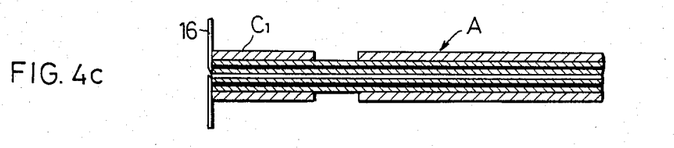

Then, the fastener 5 is released and the casings 1a and 1b and the holders 3a and 3b are opened and the cable is removed. The forward end portions of sheath C1 and the extended coatings B1 are cut by a conventional cutter 16 approximately at the ends of core wires B2 (FIG. 4c). This cutting may instead be made before the apparatus is opened in the event the stretched coating B1 tends to move back on the core wires when the compression of the clamps 15 is removed.

Figure 4D:
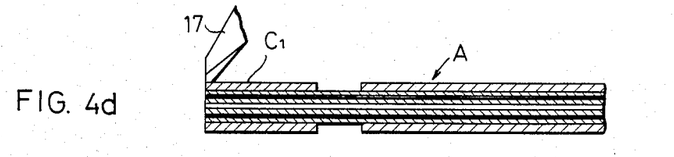
Figure 4E:
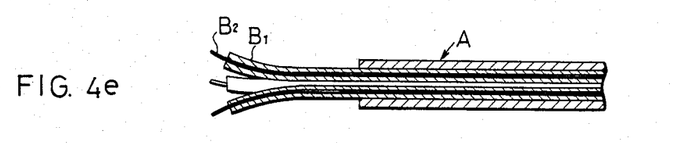

The separated sheath portion C1 is then cut longitudinally by another conventional cutter blade 17 (FIG. 4d) to be opened and removed in order to expose the end portions of coated wire B. As a result, the previously stretched or extended coatings B1 return or contract, so that the core wires B2 protrude from the ends of the coating B1 (FIG. 4e).

Figure 5:
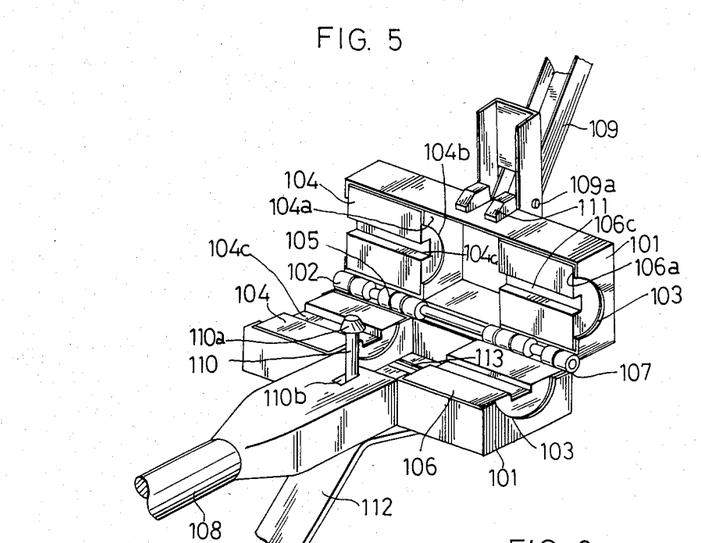
FIG. 5 is a perspective view of an alternate construction of the apparatus in FIGS. 1 and 2, showing it in an open condition.
Figures 6, 7:
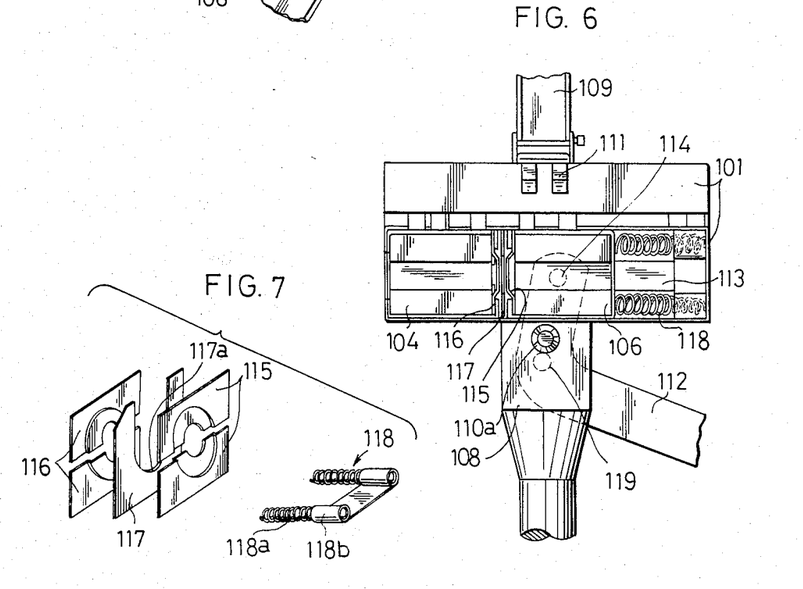
FIG. 6 is a plan view of apparatus similar to that shown in FIG. 5 in an open condition and including additional parts.
FIG. 7 is a perspective view of the additional parts included in the apparatus of FIG. 6.

FIGS. 5–7 show the apparatus which is designed to both remove the sheath from the end of a cable and also attach a connection terminal to a coated wire.

In FIG. 5, a pair of elongated casings 101 each have a web side, two side walls, two end walls and an open side. The casings are pivotably coupled together by hinges 102 at the open edge of one side wall. Each casing 101 has recesses 103 in both of its end walls to receive a cable or wire.

A pair of fixed resilient clamp dies 104 are each held within a box-like holder 104a, which has an open side and opposite arcuate recesses 104b in two end sides, aligned with the recesses 103 in the casings. The holders 104a are coupled together by a hinge 105, and each is secured within one end of the casing 101 at its one end. Each die 104 has a longitudinal groove 104c for mating with that in the other die.

Also included in the casings 101 are a pair of movable clamp dies 106 which have substantially the same construction as the fixed dies 104. Each has a groove 106c aligned with the grooves 104c. Each die 106 is held within a box-like holder 106a, which has substantially the same construction as the holders 104a. The holders 106a are coupled together by a hinge 107. Each holder 106a is supported for slideable movement longitudinally within one of the casings 101 between the holder 104a and the other end of the casing.

The die grooves 104c, 106c may be coated with a high friction material such as emery powder.

One casing 101 has a longitudinal slot 113 in its web side, and the slotted casing 101 has a fixed arm 108 secured to its non-hinged side wall. The arm has a bolt 110 connected to it, the bolt having a nut 110a threaded on its free or upper end. The bolt extends through a slot 110b formed in the arm, and the bolt is pivoted at its lower end on the arm 108. It normally slants toward the casing 101, but normally it engages the end of the slot 110b in the arm.

The other casing 101 has a swing arm 109 mounted at one end on its web side adjacent its non-hinged side wall by a pivot pin 109a which is axially parallel to the hinges 102 and 105. This casing 101 has a pair of spaced blocks 111 secured to the outside of its non-hinged side wall for snap engagement with the nut 110a of the fixed arm 108.

When the swing arm 109 swings in the clockwise direction (as seen in FIG. 5) away from the fixed arm 108, the lower or inner end of the swing arm moves adjacent the blocks 111 and forces the nut 110a out of engagement with the blocks 111.

The slotted casing 101 also includes a lever 112 having a curved end portion which is coupled to the movable die holder 106a by a pivot pin 114 (FIG. 6) that extends through the slot 113 in the casing. The lever 112 is supported on the fixed arm 108 by a pivot pin 119 (FIG. 6), so that the pivotal movement of the lever 112 on the pin 119 slides the die 106 longitudinally relative to the fixed dies 104. The connections of the pins 114 and 119 with the die 106 and the lever 112 are sufficiently loose that the pin 114 may swing in an arcuate path while the die 106 moves in a linear path. When a cable is clamped between the dies 106, movement of one die by the lever 112 also causes movement of the other die because of the hinge 107 connection.

The parts in FIG. 5 described so far are common to structure for baring a cable and for attaching a connection terminal. The additional parts needed for baring a cable are shown in FIGS. 6 and 7.

In FIGS. 6 and 7, a pair of cutting blades 115 are provided, one being supported detachably in each movable die holder 106a on its side adjacent the fixed die 104. Similarly a pair of clamp members 116 are detachably supported in the fixed die holders 104a on their side adjacent the movable dies 106. Instead, the cutting blades may be provided in the fixed die holders, and the clamp members in the movable die holders. The cutter blades 115 and clamp members 116 are substantially the same as the corresponding parts 14 and 15 shown in FIG. 1, and include semicircular center edges that receive the cable (not shown).

A cable guide or holder 117 has a U-shaped recess 117a that is open at one side. The recess has a width substantially equal to the outer diameter of the cable to be treated. The guide 117 is detachably supported in one casing 101 between the cutter blade 115 and clamp member 116 adjacent the clamp member, to securely hold the cable between the pairs of dies in alignment with the semicircular edges of the cutter blades and clamp members.

A spring assembly 118 (FIGS. 6 and 7) is detachably mounted in one casing 101 between a movable die holder 106a and the adjacent end of the casing, to urge the two movable dies 106 inwardly toward the fixed dies 104. The spring assembly 118 includes a pair of attached tubes 118b in side-by-side relation, and a coiled spring 118a extends into each tube 118b and has one end fixed thereto.

Figure 8A:
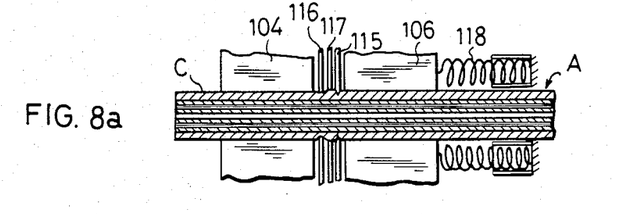
FIGS. 8a–8b are fragmentary sectional views showing steps of the method of operation of the apparatus in FIG. 6.
Figure 8B:
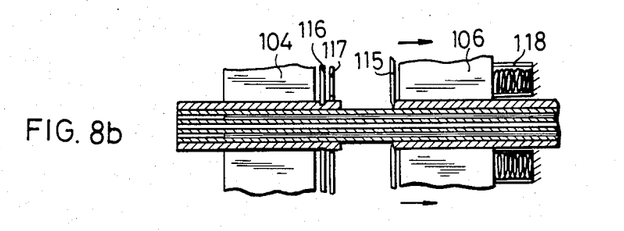

A multicore cable (not shown) is bared by the apparatus including the parts shown in FIG. 6, generally in the same manner as by the apparatus of FIGS. 1, 2. FIGS. 8a and 8b illustrate the steps in the operation. FIG. 6 shows the casings 101 opened and the movable dies 106 and the cutter blades 115 urged, by the springs 118a, into their initial positions adjacent the fixed dies 104, the clamp 116 and the guide 117. The cable to be treated is then placed in the grooves 104c and 106c.

The swing arm 109 is swung toward the fixed arm 108 to close the casings 101 and to lock them by engaging the head or nut 110a on the upper ends of the brackets 111. This causes the dies 104 and 106 and the clamp member 116 to compressively clamp the cable, and the cutter blades 115 to cut through the sheath C as illustrated in FIG. 8a.

The lever 112 is then turned by hand in the clockwise direction as seen in FIG. 6, toward the arm 108 to move the dies 106 and the cutter blades 115 away from the dies 104 and the clamp members 116 against the force of springs 118a (FIG. 8b). This cuts out the sheath C. If the lever 112 is then released, the springs 118a are not so strong as to force the dies 106 back toward the dies 104 while the dies are tightened on the cable. The swing arm 109 is then swung away from the arm 108 to disengage the nut 110a from brackets 111 as previously explained. The remaining steps are substantially the same as shown in FIGS. 4c–4e.

A connection terminal D is attached to the end of one of the coated wires using the apparatus shown in FIG. 5 (the cutter blades 115, clamp members 116, the guide 117 and the spring assembly 118 are removed from the FIG. 6 construction). In advance, the wire end is trimmed to align the ends of the coating and the core wire. FIGS. 9a–9d illustrate the method of attachment.

Figures 9A, 9B, 9C, 9D:
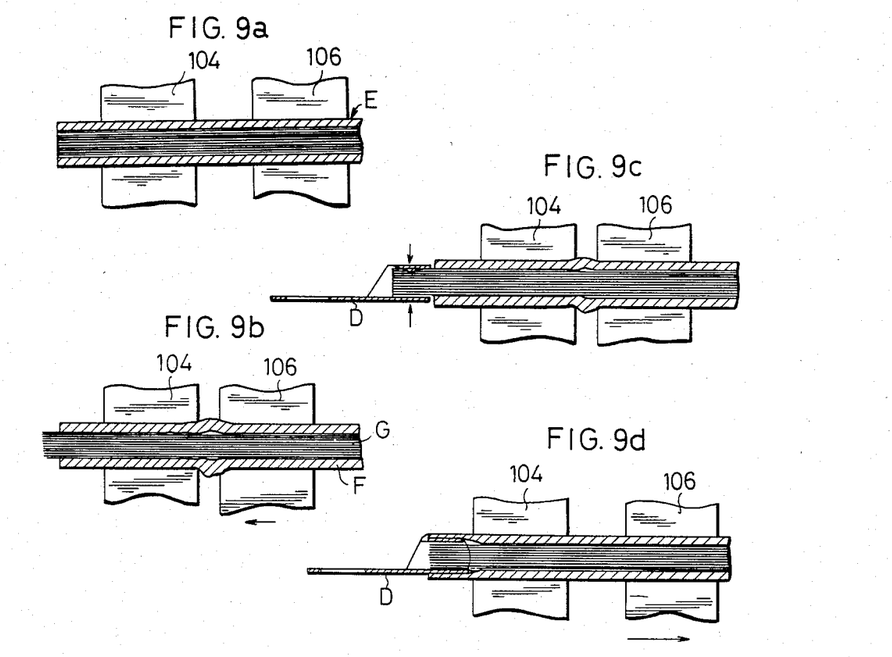
FIGS. 9a–9d are fragmentary sectional views showing steps of the method of operation of the apparatus in FIG. 5.

Before the cable is clamped in the structure shown in FIG. 5, the lever 112 is turned to move the dies 106 away from the dies 104. As shown in FIG. 9a, the coated wire E is then clamped by the dies 104 and 106, with its trimmed end portion protruding from the outer side of fixed dies 104.

The lever 112 is then turned to move the dies 106 toward the dies 104. The clamp members 104 are resilient and grip the coating F but do not tightly grip the wires G, whereas the members 106 tightly grip the wires. Movement of the dies toward each other thereby longitudinally compresses the portion of the coating F between the die pairs causing it to bulge (FIG. 9b) and expose the end of core wire G. The connection terminal D is then attached to the bared wire end by any suitable means (not shown), such as a hand-operated crimping tool (FIG. 9c).

The lever 112 is then turned reversely to move the dies 106 away from the dies 104, causing the core wires G to move to the right. As a result, the end portion of the coating F moves over the terminal shank D (FIG. 9d).

Figure 10:
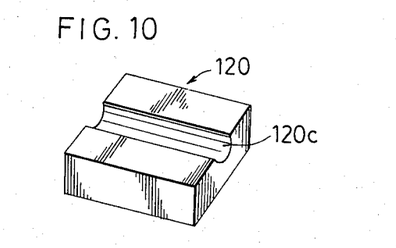
FIG. 10 is a perspective view of an alternative form of a part of the apparatus in FIGS. 5 or 6.
Figure 11A:
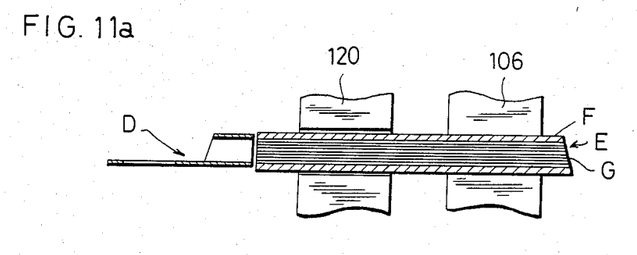
FIGS. 11a–11c are fragmentary sectional views similar to FIGS. 9a–9d, but showing a different method.
Figure 11B:
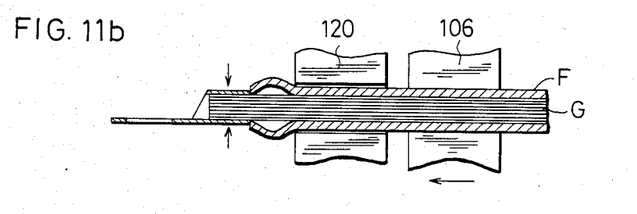
Figure 11C:
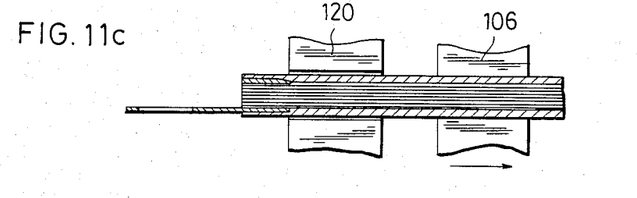
Figure 12:
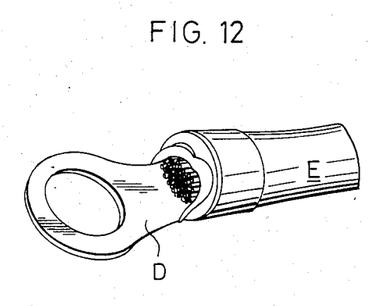
FIG. 12 is a perspective view of an article made by the method illustrated in FIGS. 9a–9d or 11a–11c.

In FIG. 5, the fixed dies 104 may be replaced by an alternative pair of dies 120, one of which is shown in FIG. 10. Each die 120 has a longitudinal groove 120c of a semicircular section slightly larger in radius than the coated wire E (FIG. 9a). FIGS. 11a–11c show the method of attaching a connection terminal D to the coated wire E by the use of dies 120.

In FIG. 11a, the apparatus is closed allowing the movable dies 106 to clamp the wire E, which is, on the other hand, surrounded loosely and slideably by the grooves 120c of fixed dies 120. The terminal D is fixedly held by suitable means (not shown) adjacent the forward end of wire E and in alignment with it.

In FIG. 11b, the movable dies 106 are moved toward the fixed dies 120, allowing the forward end of core wire G to enter the shank of terminal D, and the forward end of coating F to engage the rear end of the terminal shank so that the coating end portion bulges. The terminal D shank is then compressed radially inwardly to be attached to the core wire G end by suitable means (not shown).

In FIG. 11c, after releasing the holding of terminal D, the movable dies 106 are moved away from the fixed dies 120, the bulged coating portion engages the forward end of fixed dies 120 and is forced to move over the terminal D shank.

Figure 13:
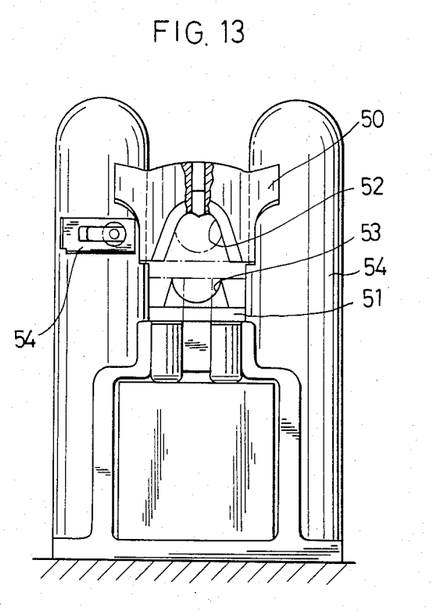
FIG. 13 is a front view of an apparatus for use with the apparatus of FIG. 5 in pressing a connection terminal on a bared wire end.
Figure 14:
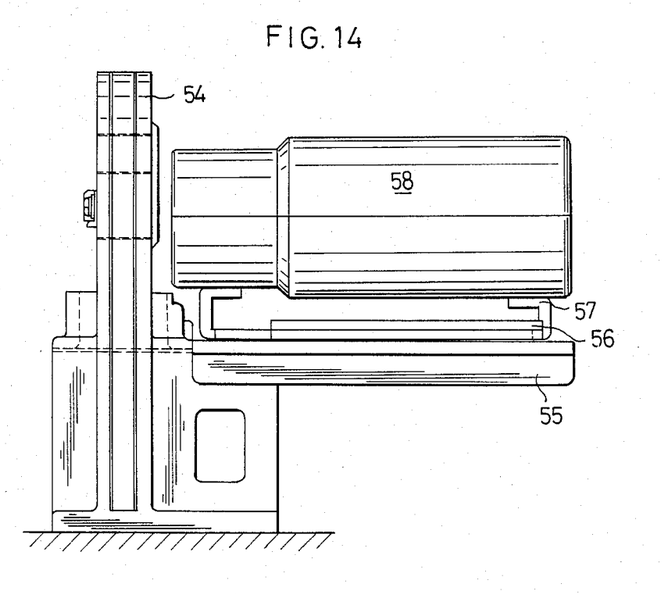
FIG. 14 is a side view of the apparatus of FIG. 13, with the FIG. 5 apparatus mounted thereon.

FIGS. 13, 14 show an apparatus, which forms no part of this invention, which may be used with the FIG. 5 apparatus to crimp a connection terminal D to be secured to the bared wire end at the FIG. 9c step.

In FIG. 13, such an apparatus includes an upper die 50 and a lower die 51. The dies have mating semicircular grooves 52 and 53 of a radius somewhat smaller than the outer radius of the tubular part of the connection terminal. The upper die 50 is fixed to a support 54. The lower die 51 is supported to be moved up and down relative to the upper die 50.

In FIG. 14, the support 54 has a table 55 secured thereto and has a pair of rails 56, along which a carrier 57 is moved. The carrier is adapted to support the apparatus 58 or that shown in FIG. 5 for baring a coated wire end.

In operation, the apparatus 58 is moved to locate the bared wire end with the terminal D (FIG. 9c) between the dies 50, 51. Then, the lower die 51 is lifted to press the terminal on the core wire.

The apparatus in FIGS. 13, 14 may also be used to hold the terminal D in the step of FIG. 11a and crimp it in the step of FIG. 11b.

I claim:

1. A method of baring an end portion of an electric multicore cable including a plurality of coated wires enclosed in an outer sheath, said method comprising the steps of:

clamping said cable at first and second longitudinally spaced positions removed from said cable end;

making a circumferential cut in said sheath to form a cut sheath end portion adjacent said end;

moving the clamped positions relative to each other to separate said cut end portion from the remainder of the sheath, and to expand said coatings beyond the ends of the wires;

trimming said expanded coatings substantially at said wire ends;

releasing the clamping and removing said cut sheath end portion to allow the expanded coatings to return to normal positions and thereby expose said wires.

2. A method of baring an end of an electric cable including a plurality of coated wires enclosed in a sheath, comprising the steps of tightly gripping an end portion of the cable, tightly gripping said cable at a location which is spaced from said end portion, cutting said sheath between said first and second clamp means, moving said second clamp means away from said first clamp means after said sheath has been cut, said second clamp means gripping said cable sufficiently to move said cable and said wires with it, and said first clamp means holding said cut end portion of said sheath and said coating against said movement, said coatings and said cut end portion of said sheath are extended past the ends of said wires, severing said sheath and said coatings at the ends of said wires, releasing said grips on said cable, and removing said cut end portion of said sheath to enable said extended coatings to retract from the ends of said wires.

3. Apparatus for baring an electric cable including a plurality of coated wires covered by a sheath, said apparatus comprising:

a pair of box-like frames, hinge means having a hinge axis, said frames being attached to said hinge means and thereby hinged together for movement between open and closed positions, said frames being adapted to receive the cable therebetween, the cable extending generally parallel with said hinge axis;

a first pair of adjacent clamp members, each of said members of said first pair being fastened to one of said frame adjacent one end thereof;

a second pair of adjacent clamp members, each of said members of said second pair being attached to one of said frames and slideably supported within said frames and slideable generally parallel with said hinge axis;

a pair of adjacent cutter blades, each of said blades being attached to one of said frames and said pair of blades being supported within said frames adjacent said pairs of clamp members, and each of said blades having an arcuate cutting edge for cutting through said sheath; and lever means coupled to said frames and to said movable clamp members for moving said second pair of clamp members relative to said first pair of clamp members.

4. Apparatus according to claim 3, wherein one of said frames has a slot formed in a wall thereof, said lever means including first and second levers, said first lever being connected to one of said frames, said second lever being pivotally coupled to said second pair of clamp members and extending through said slot, and said levers being pivotally coupled together.

5. Apparatus according to claim 3, wherein said cutter blades are mounted adjacent said first pair of clamp members.

6. Apparatus according to claim 3, wherein said cutter blades are mounted between said first and second pairs of clamp members.

7. Apparatus according to claim 3, wherein said cutter blades are detachably supported adjacent and are movable with said second pair of clamp members.

8. Apparatus according to claim 7, and further comprising a third pair of clamp members, each of said members of said third pair being attached to one of said frames and said third pair of clamp members being detachably supported within said frames between said first and second pairs of clamp members, said third pair being adjacent said first pair of clamp members.

9. Apparatus according to claim 3, and further comprising spring means mounted within said frames and connected between said frames and said second pair of clamp members for urging said second pair of clamp members toward said first pair.

10. Apparatus according to claim 2, and further including means connected to said pair of said frames for releasably holding said frames in said closed position.

11. Apparatus according to claim 3, wherein said clamp members have grooves therein for receiving said cable.

12. Apparatus according to claim 3, wherein said cutter blades are closely adjacent an end of said frames.

13. Apparatus for baring an end of an electric cable including a plurality of coated wires enclosed in a sheath, comprising a casing, first clamp means attached to said casing for tightly gripping an end portion of the cable, second clamp means attached to said casing for tightly gripping said cable at a location which is spaced from said end portion, cutter blades attached to said casing between said first and second clamp means for cutting through said sheath, means coupled to said second clamp means for moving said second clamp means away from said first clamp means after said sheath has been cut, said second clamp means gripping said cable sufficiently to move said cable and said wires with it, and said first clamp means holding said cut end portion of said sheath and said coatings against said movement, whereby said coatings and said cut end portion of said sheath are extended past the ends of said wires.

* * * * *